US006571606B2

(12) United States Patent
Fleury et al.

(10) Patent No.: US 6,571,606 B2
(45) Date of Patent: Jun. 3, 2003

(54) DEVICE INTENDED FOR SEALED ELECTRIC CONNECTION OF ELECTRODES BY SHIELDED CABLES AND SYSTEM FOR PETROPHYSICAL MEASUREMENT USING THE DEVICE

(75) Inventors: Marc Fleury, Domaine St François d'Assise (FR); Gabriel Ringot, rue Barbes (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 66 days.

(21) Appl. No.: 09/866,633

(22) Filed: May 30, 2001

(65) Prior Publication Data

US 2001/0046811 A1 Nov. 29, 2001

(30) Foreign Application Priority Data

Jun. 2, 2000 (FR) ........................................... 00 07123

(51) Int. Cl.[7] .......................... G01N 15/08; H01R 9/03
(52) U.S. Cl. ........................... 73/38; 439/578; 439/610
(58) Field of Search ............................. 73/38; 439/271, 439/578, 598, 610

(56) References Cited

U.S. PATENT DOCUMENTS 3,197,730 A * 7/1965 Hargett ..................... 174/75 R
3,275,737 A * 9/1966 Caller ...................... 174/71 C
3,690,166 A * 9/1972 Grice et al. .................... 175/41
3,877,775 A * 4/1975 Barlow et al. ................ 174/19
4,154,302 A * 5/1979 Cugini ....................... 166/378
4,295,701 A * 10/1981 Gunn ......................... 439/190
4,373,767 A * 2/1983 Cairns ........................ 439/199
4,545,633 A * 10/1985 McGeary .................... 439/141
5,618,208 A * 4/1997 Crouse et al. .............. 439/609
5,683,270 A * 11/1997 Warislohner ................ 439/606
5,979,223 A * 11/1999 Fleury ........................... 73/38

FOREIGN PATENT DOCUMENTS

EP 768736 A2 * 4/1997
EP 974839 A1 * 1/2000

* cited by examiner

*Primary Examiner*—Hezron Williams
*Assistant Examiner*—Michael Cygan
(74) *Attorney, Agent, or Firm*—Antonelli, Terry, Stout & Kraus, LLP

(57) ABSTRACT

A device for connecting, by means of a shielded cable, electrodes to a measuring device, located on either side of a wall (18) separating an enclosure under pressure from the outside environment. The device comprises a rigid protector sleeve (16) made of an insulating material that tightly runs through the wall and extends to the immediate vicinity of the electrode, into which shielded cable (C) is passed. A tube (23) made of a conducting material is arranged in rigid sleeve (16) and in electric contact with the cable shield. A plug (24) is secured to rigid sleeve (16), connected to electrode (15) and electrically linked to core (21) of the shielded cable inside metal tube (23). An electric connector (20) is associated with rigid sleeve (16) outside wall (18) for connection of a shielded wire connected to the measuring device. This device can be used in a system measuring the electrical resistivity of a sample in a frequency range that can reach several ten MHz.

17 Claims, 6 Drawing Sheets

DEVICE INTENDED FOR SEALED ELECTRIC CONNECTION OF ELECTRODES BY SHIELDED CABLES AND SYSTEM FOR PETROPHYSICAL MEASUREMENT USING THE DEVICE

BACKGROUND OF THE INVENTION

1. Field of the Invention

The present invention relates to a device for precisely establishing in the laboratory the curve of the resistivity index of a solid sample independently of the capillary pressure curve, suited for high-frequency measurement.

2. Description of the Prior Art

Measurement of the resistivity index of small cores is necessary to obtain a precise estimation of the water saturation from log data obtained for example by means of the measurement while drilling (MWD) technique.

French Patent 2,781,573 and U.S. Pat. No. 5,979,223, filed by the assignee notably describe methods and devices intended for continuous measurement of the resistivity index curve of a solid sample initially saturated by a first wetting fluid, such as a geologic sample, independently of the capillary pressure curve. The porous solid sample is contained in a sealed sheath placed in an elongate containment cell between two terminal parts. Channels provided through the two terminal parts communicate with an injection system which injects a second, non-wetting fluid into the sample at a first end of the cell and drains the first fluid from the cell at the opposite end, through a semipermeable membrane permeable to the first fluid. The sample is contained in a sheath and subjected to a radial pressure by injection of oil under pressure into the annular space between the body of the cell and the sheath. A membrane, wettable only by the second fluid, is interposed between the sample and the first end of the cell for re-imbibition operations.

Electrodes interposed between the sample and a sheath apply an electric current and detect potential differences that appear between distinct points in response to the application of an electric current. The electrodes are connected to a device measuring the complex impedance of the sample. The longitudinal extension of the electrodes is relatively great in relation to the length of the sample so that the largest possible part of the volume of the sample is involved in the impedance measurement while avoiding short-circuits through the ends of the sample which are likely to distort the measurements.

One or more injection pressure stages are applied and the continuous variations of the resistivity index as a function of the mean saturation variation are measured without waiting for the capillary equilibria to be established.

The annular space between the sheath and the external wall of the cell is under high pressure and the electric conductors connecting the electrodes to the measuring device run through the external wall of the cell through sealed bushings (glass bead connectors for example).

Studies show that the resistivity index of porous rocks varies substantially with the frequency. As logging sondes measure the electric resistance during crossing of formations often at very high frequencies, the sondes must be able to work with precision in the same frequency range in order to really compare the measurements obtained by means of the well tools to the resistivity index measurements obtained in the laboratory by means of the cells.

The results obtained with the previous cells are satisfactory when the frequency range of the applied electric currents remains within a limit of several to ten KHz. The results lose a lot of significance when the impedance measurements are carried out at much higher frequencies ranging for example between 1 MHz and 10 MHz. At such frequencies, shielded cables of constant impedance must of course be used. Continuous connection of the electrodes to the measuring device by means of shielded cables is difficult to achieve because of sealing problems. If a conventional connector of glass bead type is used, this leads to a break in the continuity of the shielding. This discontinuity, which would have no notable effect at low frequencies, is the source of parasitic reflections and of a significant attenuation of the signals at high frequencies.

SUMMARY OF THE INVENTION

The device according to the invention allows connection, by means of a shielded cable, to at least one electrode to a measuring device, located on either side of a wall separating an enclosure under pressure from the outside environment. The device comprises at least one rigid protector sleeve made of an insulating material that tightly runs through the wall and extends to the immediate vicinity of the electrode, wherein the shielded cable is passed. The rigid sleeve contains a tube made of a conducting material that is in electric contact with the shield of the cable and is rigidly and tightly associated with a connection means connecting electrically the core of the shielded cable to the electrode.

The electric connection means comprises, for example, a plug connected to the electrode, with a baseplate that is rigidly and tightly fastened in a cavity of the sleeve and electrically connected to the core of the shielded cable.

In order to account for a possible motion of the electrode, the plug is engaged in a hollow of the electrode and maintains electric contact with the electrode in which the plug moves.

In an embodiment the device of the invention comprises an electric connector associated with the rigid sleeve outside the wall for connection of a shielded wire connected to the measuring device, a shielded cable element within the rigid sleeve whose core is connected to the connection means, and the shield is electrically connected to the conducting tube that extends to the inside of the rigid sleeve as far as the zone where the core is connected to the connection means.

The wall is, for example, the wall of the body of a cell which measures of the variations of the resistivity index of a porous solid sample embedded in a sheath and is subjected to a radial pressure by injection of a liquid under pressure into the body of the cell, these variations resulting from operations of forced displacement of a first fluid out of the sample by injection of a second fluid, one of the two fluids being electricity conducting, unlike the other one which is not electrically conductive, by means of electrodes arranged between the sample and the sheath and provided each with an extension running through the sheath, each rigid sleeve running through the wall of the cell body and extending substantially to the sheath.

The measuring system according to the invention comprises an elongate containment cell for a sample in a sheath, means for injecting a liquid under pressure into the body of the cell so as to exert a radial pressure on the sample, electrodes arranged between the sample and the sheath, which apply an electric current and detect potential differences appearing between distinct points of the sample in response to the application of the electric current. The electrodes are each provided with an extension running through the sheath and are connected to a device measuring the impedance of the sample, outside the cell body, a first semipermeable filter permeable to the first fluid and contacting with a first end of the sample, and injecting means for injection under pressure a second fluid through a second end of the sample. The system comprises connection devices for connecting the various electrodes to the measuring device by means of shielded cables and each connection device comprises at least one rigid protector sleeve made of an insulating material that tightly runs through the wall and extends to the immediate vicinity of the electrode, wherein the shielded cable is passed, the rigid sleeve containing a tube made of a conducting material in electric contact with the shield of the cable and being rigidly and tightly associated with a connection means connecting electrically the core of the shielded cable to the electrode.

The electrodes preferably have a relatively great longitudinal extension in relation to the length of the sample (between ¼ and ¾ of the length of the sample and preferably of the order of ½) but are smaller than the length, so that the largest possible part of the volume of the sample is involved in the impedance measurements while avoiding short-circuits through the ends of the sample.

The connection device defined above is advantageous in that it allows a shielded wire to run tightly through a wall without any discontinuity of the core and of the shield of the cable which are likely to affect the signals transmitted, in a frequency range that can reach multiples of ten MHz.

The measuring system, with its connection device(s) as defined above, is particularly advantageous in that it allows:

- establishing a very precise curve of the continuous resistivity index during drainage in a short time (about 2 days for a typical 100 mD sandstone whereas the typical time required using the continuous injection technique is often of the order of two weeks);
- the negligible incidence of non-uniform saturation profiles during measurement. The above advantages are the result of the combination of three factors: (i) the radial resistivity measuring technique, (ii) the presence of semipermeable filters at the outlet, (iii) the total volume of the core is analyzed by means of electric measurements (which is verified when the diameter of the core is greater than its length); and
- providing precise resistivity index measurements in a very wide frequency range up to frequencies of the order of multiples of ten MHz.

BRIEF DESCRIPTION OF THE FIGURES

Other features and advantages of the invention will be clear from reading the description hereafter of a non limitative embodiment example, with reference to the accompanying drawings wherein:

FIG. 2 is a cross-sectional view of the arrangement of the electrodes around a sample allowing injection of an electric current and measurement of a potential difference generated by the current flowing through the sample;

DETAILED DESCRIPTION OF THE PREFERRED EMBODIMENTS

The connection device is described hereafter in a non limitative way in connection with an experimental system which measures the resistivity index variations of a porous solid sample, due to forced displacements of a first, electricity-conducting wetting fluid such as brine for example, by injection of a second, non-conducting fluid such as oil for example (drainage stage), or of the second fluid by the first (imbibition stage) as described in the aforementioned patents filed by the applicant.

Figure 1:
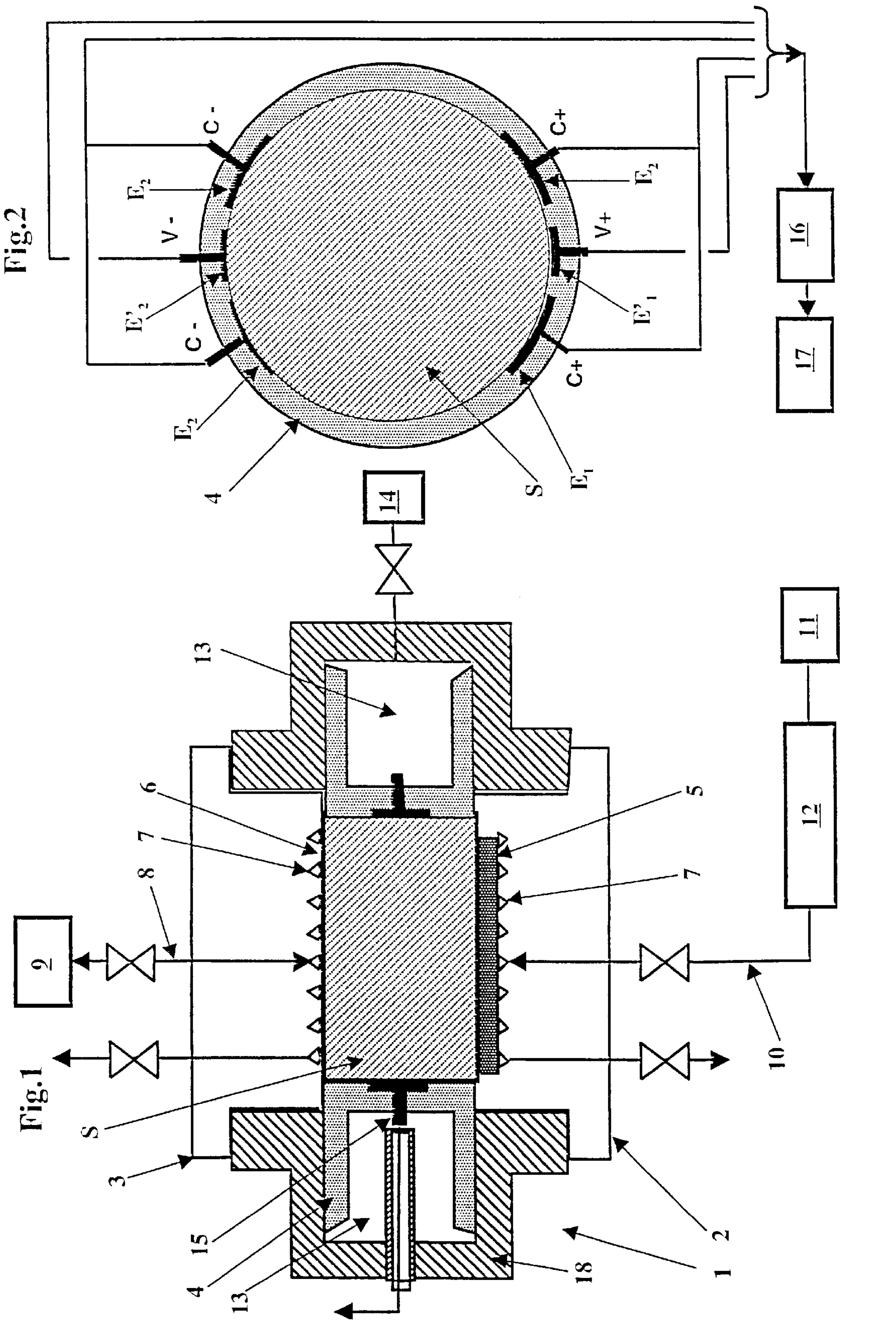
FIG. 1 diagrammatically shows, in longitudinal section, a measurement cell allowing measurement of the resistivity of a porous sample.

The connection device comprises (FIG. 1) a containment cell for holding a core, comprising a hollow body 1 of cylindrical symmetry closed at its two opposite ends by two terminal parts 2 and 3. Sample S is placed in a cylindrical elastomer part 4 whose U-shaped longitudinal section forms a sheath for sample S. All of the sample S and the sheath 4 are placed in an inner cavity of body 1 and are axially defined on either side by the two terminal parts 2, 3. On the side of terminal part 2, sample S is in contact with a semipermeable filter 5 wettable by the first fluid, such as a ceramic filter. On the side of the opposite terminal part 3, sample S is in contact with a membrane 6 wettable by the second fluid. The inner faces of terminal parts 2 and 3 are provided with a network of grooves 7 (FIG. 2). Fastening means (not shown) allow the two terminal parts to be rigidly fastened to each other.

Channels 8 run through terminal part 3 and communicate with the network of grooves 7, on a terminal face, with a first source 9 delivering the second fluid under pressure. Similarly, channels 10 run through terminal part 2 and provide communication of the corresponding network of grooves 7 with a second source of pressure 11 of the first fluid drained out of the sample as a result of the injection of the second fluid. An element 12 is installed in circuit 10 to measure the volume of fluid driven out of sample S. A low-cost capacitive pickup having a 0.05 cc precision and a 0.01 cc resolution, similar to the pickup used in the device described French Patent 2,772,477 filed by the assignee, is preferably used.

The device comprises, for example, two pairs of electrodes E1 and E2 moulded in sheath 4 so as to be closely pressed against the peripheral wall of the sample which allows application of an electric current. The potential difference V created in response to the application of the electric current is measured by means of another pair of electrodes E'1 and E'2, which are likewise moulded.

This separate allocation of the electrode pairs, one for application of an electric current, the other for potential differences measurement, avoids resistances due to contacts. The electrodes are, for example, square in shape and made of Monel. The angular extension of a pair of electrodes around the sample is less than 90°. Their length must be shorter than the length of the sample so as to avoid end short-circuits outside the sample, directly through the fluids, which would distort the measurements. However, their length must be great enough in relation to the length of the sample, so that the current lines cover the major part of the volume with a relatively even distribution. This length can vary considerably according to the diameter of the sample. In the experiments carried out, it has been found that the length of the electrodes can advantageously range between ¼ and ¾ of the length of the sample, and are preferably of the order of half the length.

Annular space 13, between body 1 and sheath 4, communicates with pressure means 14 which injects a liquid under pressure that exerts a radial confining pressure on sample S. The radial confining pressure around the sample is, for example, of the order of several MPa and is sufficient to ensure good electric contact of the electrodes. Thus, under normal conditions, the contact resistance is generally of the same order of magnitude as the resistance of the sample that has to be measured with a low water saturation.

The assembly is placed in a thermostat-controlled enclosure (not shown).

All the electrodes E are provided with a hollow extension 15 running through the thickness of sheath 14 and are connected to an RLC impedance meter 16 coupled with a measurement acquisition device 17 by the connection device described hereafter.

Figure 3:
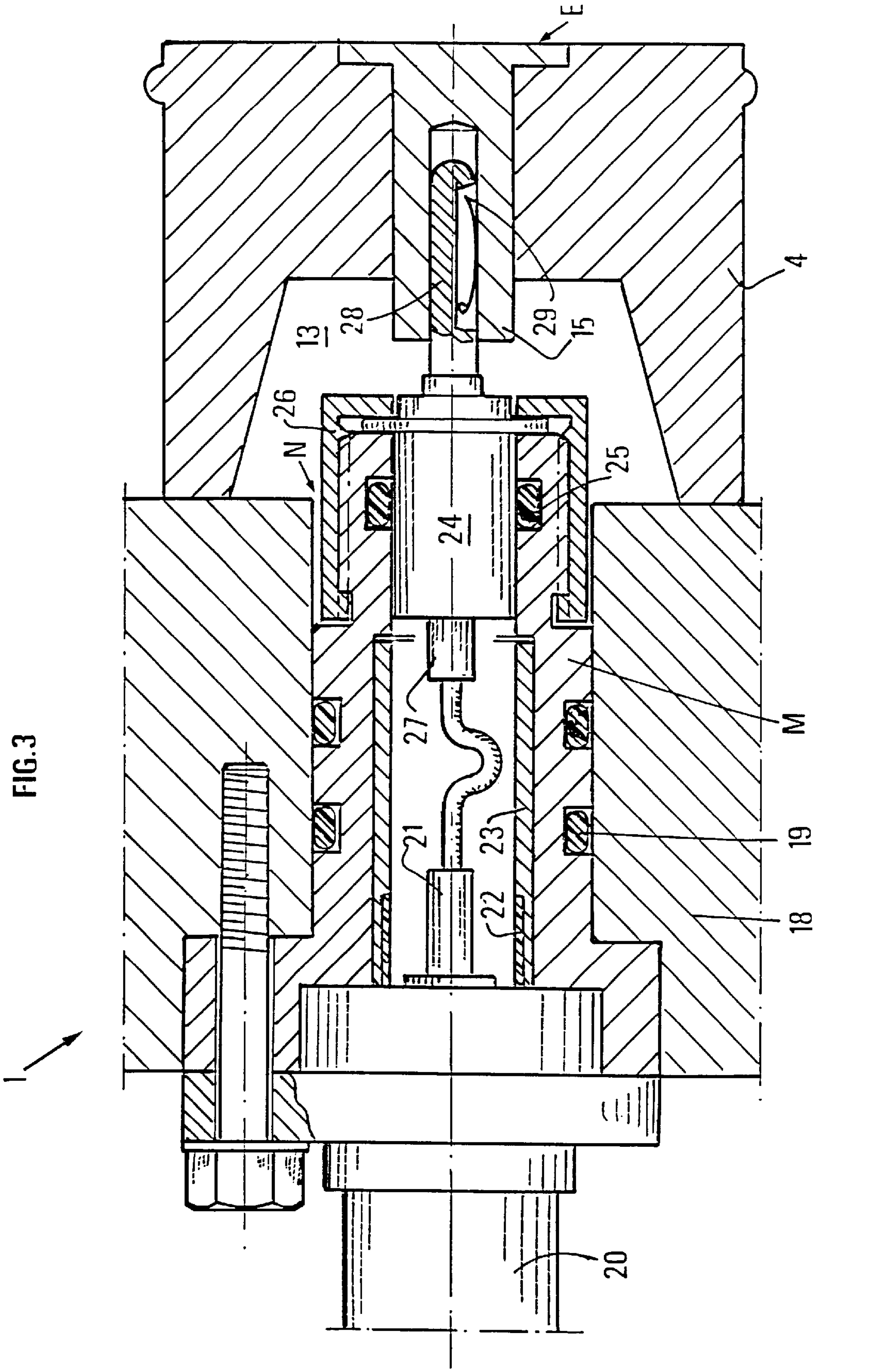
FIG. 3 diagrammatically shows, in longitudinal section, a connection device providing a sealed electric connection of a shielded cable connecting an electrode to an external measuring device.

The connection device comprises, for each electrode E (FIG. 3), a tubular sleeve M made of an insulating material that fits into a bore N in the outer terminal wall 18 of body 1and is rigidly fastened thereto. Seals 19 are arranged in grooves of tubular sleeve M. A BNC type electric connector 20, well-known in the art, is, for example fastened against the outer wall of tubular sleeve M. One end is connected to the core 21 of a shielded cable portion and the other end is connected to the braid 22 of this cable. Braid 22 is in electric contact with a stainless steel tube 23 arranged in a cylindrical cavity of tubular sleeve M. The baseplate 24 of a plug fits into another cavity at the opposite end of the tubular sleeve M and is fastened thereto by a threaded ring 26. Sealing is provided by seals 25. This baseplate 24 is provided with a first extension 27 on which core 21 of the shielded cable is welded and, at the opposite end thereof, is secured to plug 28 which fits into a housing of extension 15 of each electrode E. In order to reinforce the electric contact with extension 15 of electrode E, plug 28 is provided with a leaf spring 29. A clearance is allowed for plug 28 in its housing in electrode E which accounts for the displacements of elastomer sheath 4 when pressed against sample S through injection of liquid into annular space 13.

Stainless steel tube 13 extends to the inside of tubular sleeve M so as to cover and to electrically insulate the zone where the core of the cable is welded to extension 27. As core 21 is connected to shield 22, core 21 is electrically insulated up to a junction thereof with plug 24.

Wire 21 is relatively slack between connector 20 and terminal part 24 inside tubular sleeve M for assembly purposes.

Operation

Sample S saturated with the first fluid is placed in the enclosure and a radial confining pressure is applied by connection with pressure means 14.

A second fluid, such as oil, is then injected through channels 8 at a first pressure. The variations of the complex impedance of the sample are continuously measured for several frequencies between 0.1 Hz and multiples of ten MHz. The continuous measurements are recorded by acquisition device 16 and 17. The data is analyzed using a generalized resistivity index or impedance index according to the saturation and to the frequency f, defined as follows:

$$Ir(Sw) = \frac{|Z(Sw)|}{|Z(Sw=1)|} = g(Sw, f)$$

where $$|Z| = (\mathrm{Re}(Z)^2 + \mathrm{Im}(Z)^2)^{\frac{1}{2}}$$

Figure 7A:
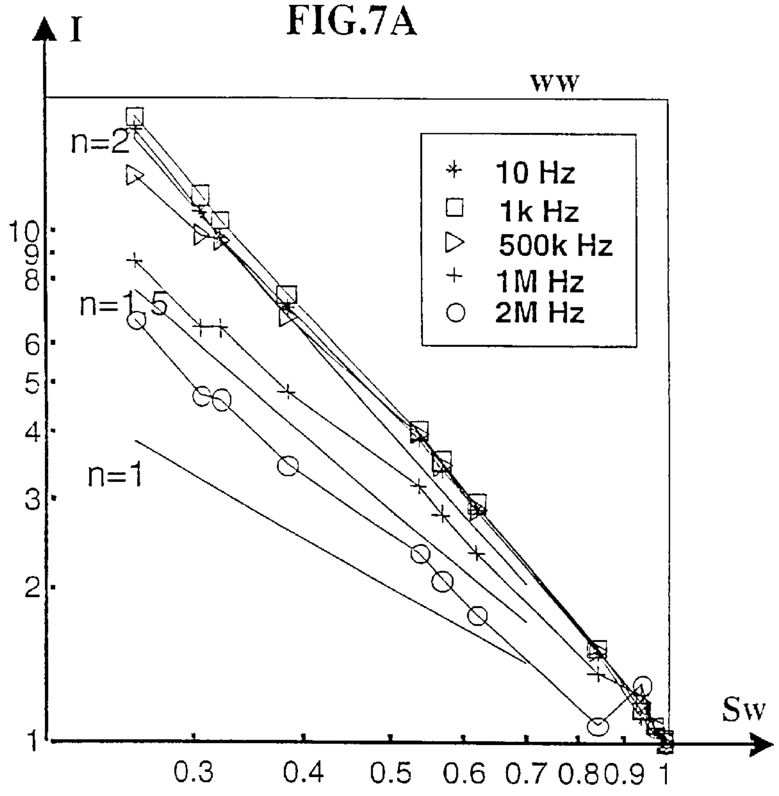
FIGS. 7A and 7B show the dispersive effects of the frequency on the curves representative of the variation of the resistivity index as a function of the brine saturation, for two Fontainebleau sandstone samples, one being water wet (ww) (FIG. 7A), the other oil wet (ow) (FIG. 7B), and the fast reduction of the slope of the curves above 500 KHz.
Figure 7B:
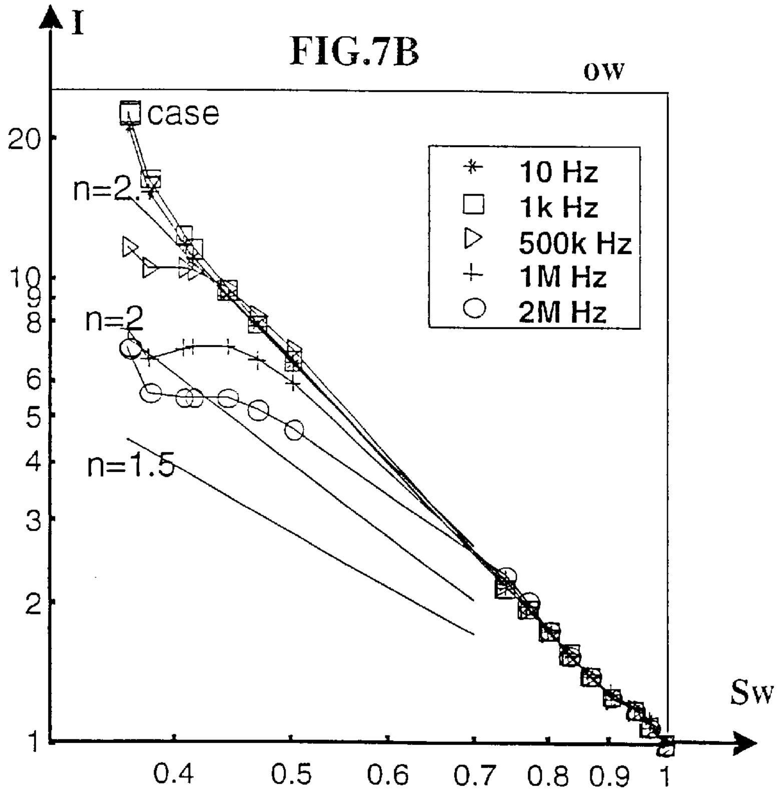

It can be confirmed that the frequency has a strong effect on the resistivity index curves Ir above 500 KHz (FIG. 7A). For the water wet sample, the data can be adjusted by applying Archie's law, which is well-known, and the saturation index decreases by 2 to 1 for curves representative of frequencies from 1 KHz down to 1.5 to 2 MHz. For the oil wet sample, the influence of the frequency is different (FIG. 7B) and the curve is markedly non-linear in a log-log scale. At high frequencies, the difference in relation to the 1 KHz curve depends on the saturation. At 2 MHz, the difference appears with Sw=0.7, and the curve becomes gradually flatter with a low saturation. If a single point of the curve was measured at low saturation, a saturation index of 2 would be obtained.

Figure 5A:
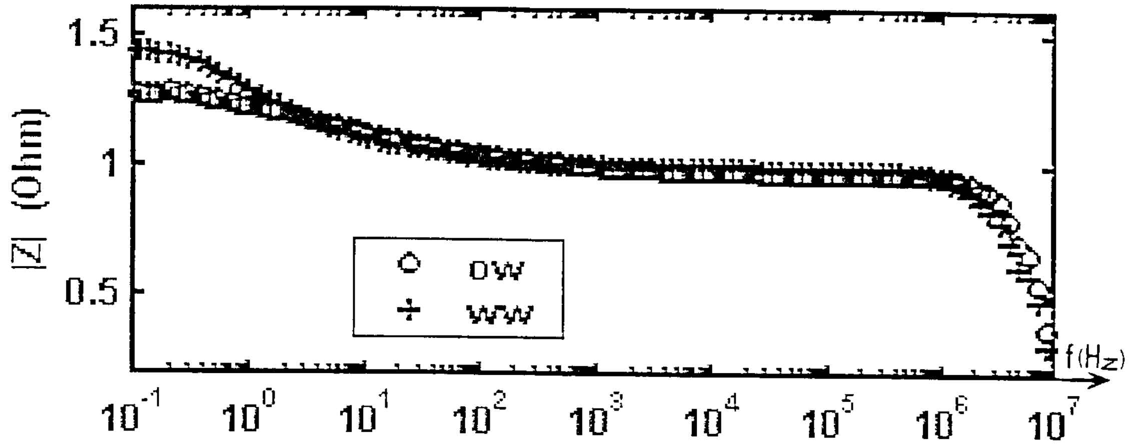
FIGS. 5A and 5B respectively show the compared variations of the normalized impedance modulus as a function of the frequency for two Fontainebleau sandstone samples that are respectively water wet (ww) and oil wet (ow) and for saturations Sw of 1 and 0.38 respectively.
Figure 5B:
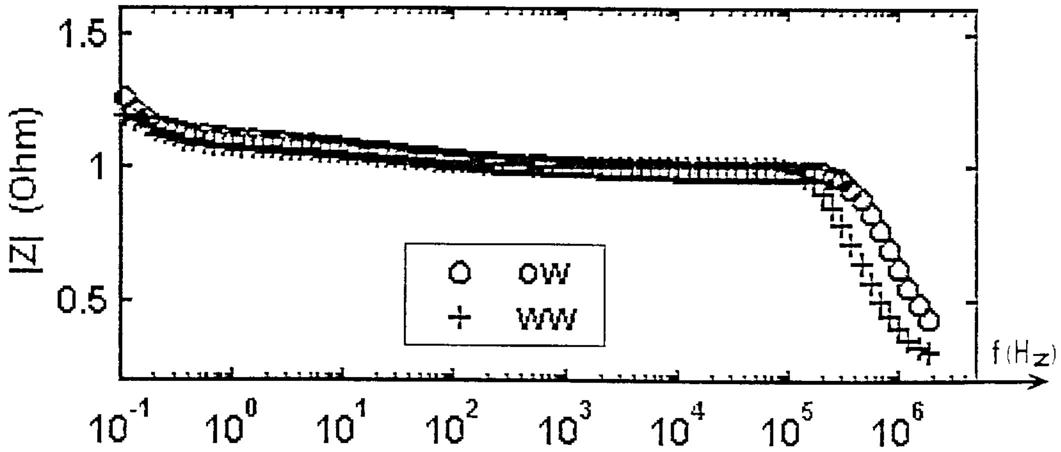
Figure 6A:
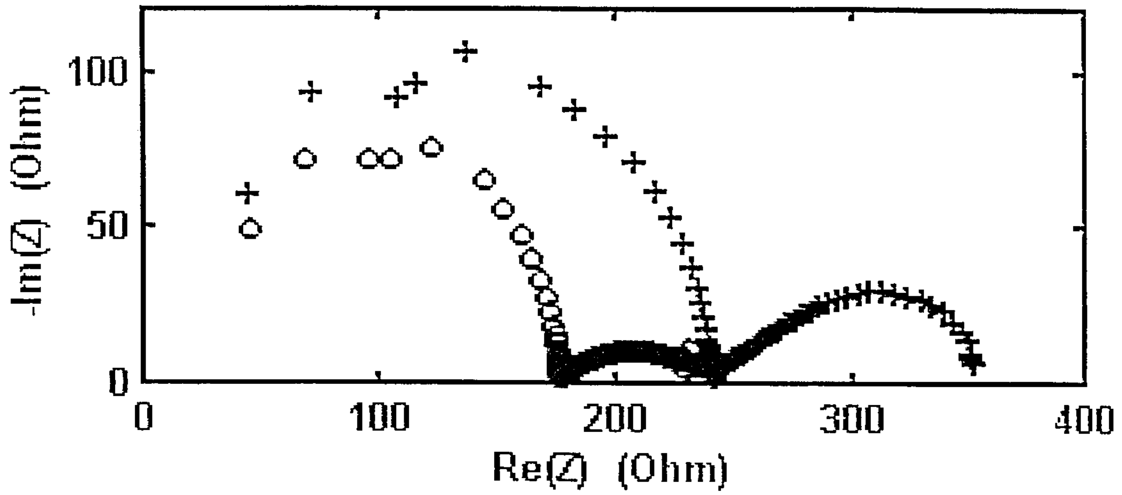
FIGS. 6A and 6B show, under the same conditions, the Argand diagrams that correspond thereto respectively.
Figure 6B:
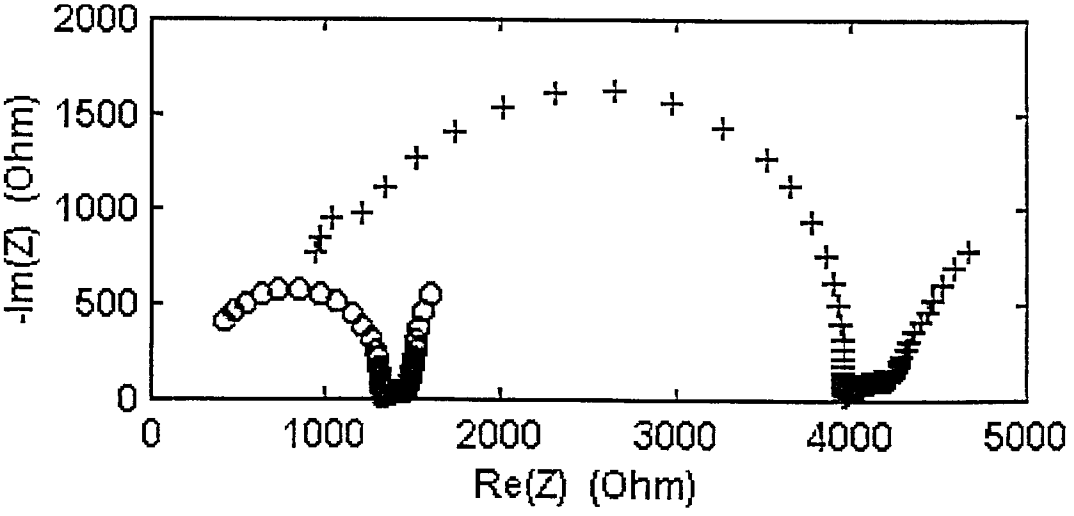

As for the curves of FIGS. 5 and 6, the dispersion curves can be extracted from the data recorded for two saturation values. For a 100% water saturation, only a minor difference can be observed at high frequency (FIG. 5A). The cutoff frequency (i.e. the vertex of the semi-circle in the Argand diagram) (FIG. 6A) is of the order of 5 MHz in both cases. At low frequency (between 0.1 and 1 KHz), the differences can be attributed to different surface roughnesses for the two samples. For a lower saturation (Sw=0.38), a cutoff frequency decrease can be observed (about 500 KHz). The phenomena attributed to the surface roughness have shifted to the lower frequencies (0.1 Hz).

Tests

Figure 4A:
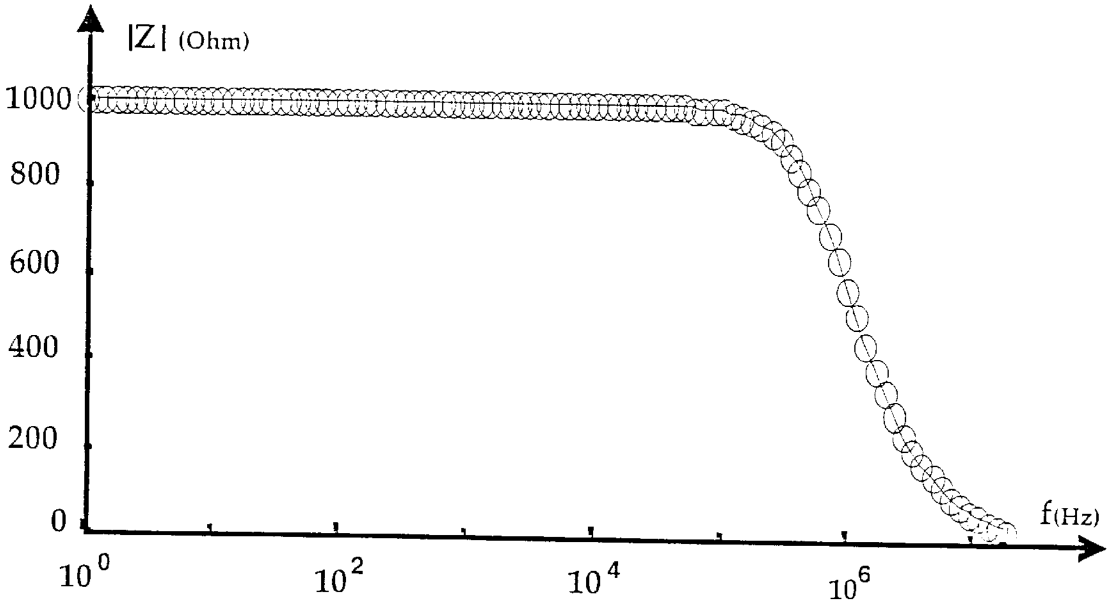
FIG. 4A shows the compared variations of the impedance modulus Z of an electric test circuit placed outside the cell (solid line) and inside the cell and connected to the impedance meter by means of the connection device described (dotted line.
Figure 4B:
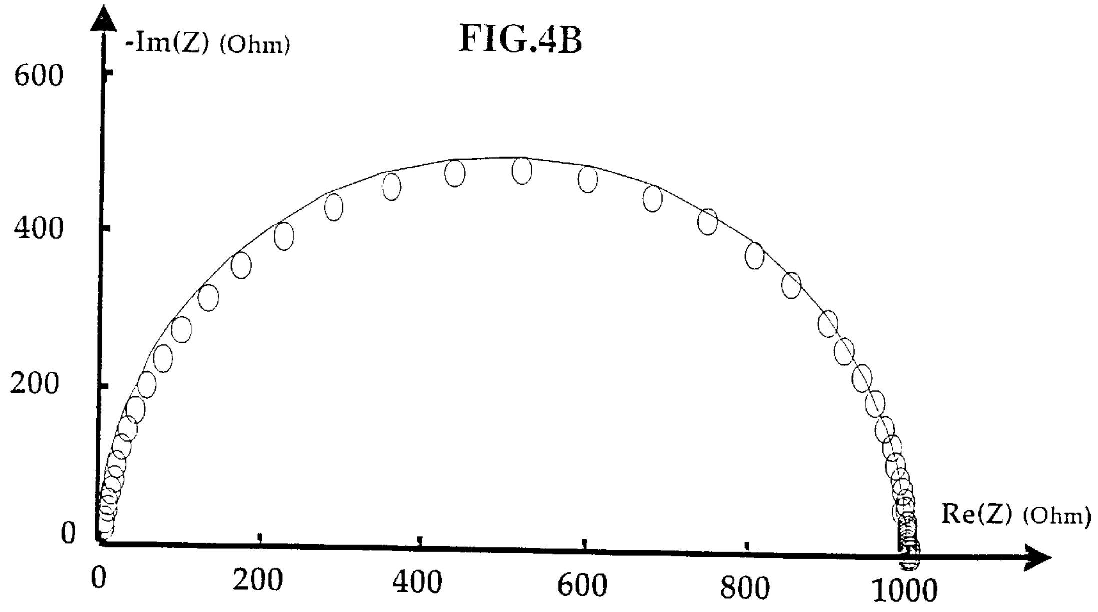
FIG. 4B shows, under the same conditions, the Argand diagrams (real part of Z in abscissa and imaginary part of Z in ordinate) that correspond thereto.

In order to test the quality of the connection device, an electric circuit consisting of a resistor of about 1 KΩ and of a capacitor having a capacitance of the order of 200 pF, reproducing typically the electric behaviour of a sample S, is placed in the cell and connected to electrodes E, 15. The complex impedance Z of the circuit has been measured for all the frequencies up to 20 MHz, when this circuit is placed outside and inside the cell and is connected by the connection device described above. It can be seen in FIGS. 4A and 4B that the results obtained are entirely identical and that the cell and the connection device do not in any way damage the quality of the measurements.

What is claimed is:

1. A device for connecting at least one electrode to a measuring device outside a wall of a cell with a cable provided with a shield and a core, the cell measuring resistivity index variations of a porous solid sample embedded in a sheath and subjected to a radial pressure by injection of a liquid under pressure into a body of the cell, the resistivity index variations resulting from a forced displacement of a first fluid out of the sample by injection of a second fluid, one of the fluids being electricity conductive and one of the fluids being electrically non conductive, the at least one electrode being disposed between the sample and the sheath and including an extension running through the sheath, comprising:

at least one insulating tubular sleeve extending toward the sheath, fastened to the wall and running through the wall, each tubular sleeve including an inner cavity into which the shielded cable passes, an electrically conductive tube disposed in the tubular sleeve and in electrical contact with the shield of the cable, an electrical connection comprising a plug connected to the at least one electrode with a baseplate fitting into the inner cavity of the tubular sleeve and electrically connected with the core of the cable inside the tube, and a seal, associated with the tubular sleeve and with the electric connection, which insulates an inside of the cell from an outside of the cell and the inner cavity of the tubular sleeve.

2. A system for measuring physical quantities of a porous solid sample placed in a sheath, comprising an elongate containment cell for the sample in the sheath, means for injecting a liquid under pressure into a body of the cell which exerts a radial pressure on the sample, and means which measures resistivity index variations of the sample caused by forced displacement of a first fluid out of the sample by injection of a second fluid, one of the fluids being electrically conductive and another of the fluids not being electrically conductive comprising:

at least one electrode between the sample and the sheath provided with an extension running through the sheath, a connecting device which connects the at least one electrode with a measuring device outside the cell, comprising a shielded cable with a shield and a core, at least one insulating tubular protector sleeve fastened to a wall of the cell and running through the wall, the tubular sleeve comprising an inner cavity through which the shielded cable passes, a conductive tube in the tubular sleeve and in electrical contact with the shielded cable, at least one electrical connection element comprising a plug connected to the at least one electrode with a baseplate fitting into the inner cavity of the tubular sleeve and electrically connected to the core of the shielded cable inside the conductive tube, and a seal associated with the tubular sleeve and with the at least one electrical connection element which insulates an inside of the cell from outside the cell and the inner cavity of the tubular sleeve.

3. A system as claimed in claim 2, comprising electrodes for applying an electrical current and detecting potential differences appearing between spaced apart locations of the sample in response to an application of the electrical current, and the cell including a first semipermeable filter permeable to the first fluid and substantially in contact with a first end of the sample, and at least one injection element which injects a second fluid through a second end of the sample under pressure.

4. A system as claimed in claim 3, wherein the plug is rigidly and tightly fastened by the baseplate in a cavity of the tubular sleeve.

5. A system as claimed in claim 4, wherein the plug fits into a hollow of the electrode and maintains the electrical contact with the electrode when the electrode moves.

6. A system as claimed in claim 2, comprising an electrical connector, associated with tubular sleeve outside the wall which connects a shielded wire connected with the measuring device, a second shielded cable element inside the tubular sleeve with the core connected to the at least one connection element, and the shield of the second shielded cable electrically connected to the conductive tube extending to inside of the tubular sleeve up to a zone where a core of the second shielded cable is connected to the at least one connection elements.

7. A system as claimed in claim 2, comprising electrodes having a greater (longitudinal extension in relation to a length of the sample but smaller than the length of the sample, so that a largest possible part of a volume of the sample influences impedance measurements without causing a short-circuit through an end of the sample.

8. A device for connecting at least one electrode to a measuring device outside a wall of a cell by a cable provided with a shield and a core, the cell measuring resistivity index variations of a porous solid sample embedded in a sheath and subjected to a radial pressure by injection of a liquid under pressure into the body of the cell, the resistivity index variations resulting from forced displacement of a first fluid out of the sample by injection of a second fluid, one of the fluids being electricity conductive and another of the fluids being non electrically conductive, the at least one electrode being disposed between the sample and the sheath, and provided with an extension running through the sheath, comprising at least one insulating tubular sleeve extending to the sheath, fastened to the wall and running through the wall, each tubular sleeve including an inner cavity into which the shielded cable passes, a conductive tube disposed in the tubular sleeve and in electrical contact with the shielded cable, an electrical connection comprising a plug connected to the at least one electrode with a baseplate fitting into the inner cavity of the tubular sleeve and electrically connected with the core of the shielded cable inside the tube, and a seal associated with the tubular sleeve and with the electrical connection, which insulates an inside of the cell from an outside of the cell and the inner cavity of the tubular sleeve, each tubular sleeve running through the wall of the cell, wherein the plug fits into a hollow of the at least one electrode and maintains the electrical contact therewith when the electrode moves.

9. A device for connecting at least one electrode to a measuring device outside a wall of a cell by means of a cable provided with a shield and a core, the cell measuring resistivity index variations of a porous solid sample embedded in a sheath and subjected to a radial pressure by injection of a liquid under pressure into the body of the cell, the resistivity index variations resulting from forced displacement of a first fluid out of the sample by injection of a second fluid, one of the fluids being electrically conductive and another of the fluids being non electrically conductive, the at least one electrode being disposed between the sample and the sheath and provided with an extension running through the sheath, comprising at least one insulating tubular sleeve extending toward the sheath, fastened to the wall and running through the wall, each tubular sleeve including an inner cavity into which the shielded cable passes, an electrically conductive tube disposed in the tubular sleeve and in electric contact with the shielded cable, an electrical connection comprising a plug connected to the at least one electrode with a baseplate fitting into an inner cavity of the tubular sleeve and electrically connected with the core of the shielded cable inside the tube, and a seal, associated with the tubular sleeve and with the electric connection, which insulates an inside of the cell from an outside of the cell and an inner cavity of the tubular sleeve, the tubular sleeve running through a wall of a body of the cell, an electrical connector associated with the tubular sleeve outside the wall for connection of a shielded wire connected with a measuring device, a shielded cable element inside the tubular sleeve with the core being connected to the electrical connection, and a shield electrically connected to the electrically conductive tube extending to inside of the tubular sleeve as far as a zone where the core is connected to the electrical connection.

10. A device for connecting at least one electrode to a measuring device outside a wall of a cell by a cable provided with a shield and a core, the cell measuring resistivity index variations of a porous solid sample embedded in a sheath and subjected to a radial pressure by injection of a liquid under pressure into a body of the cell, the resistivity index variations resulting from forced displacement of a first fluid out of the sample by injection of a second fluid, one of the fluids being electrically conductive and another of the fluids being non electrically conductive, the at least one electrode being disposed between the sample and the sheath and being provided with an extension running through the sheath, comprising at least one insulating tubular sleeve extending substantially to the sheath, fastened to the wall and running through the wall, each tubular sleeve including an inner cavity into which the shielded cable passes, a conductive tube disposed in the tubular sleeve and in electric contact with the shield of the cable, an electrical connection comprising a plug connected to the at least one electrode with a baseplate fitting into the inner cavity of the tubular sleeve and electrically connected with the core of the shielded cable inside the tube, and a seal associated with the tubular sleeve and with the electrical connection which insulates an inside of the cell from an outside of the cell and the inner cavity of the tubular sleeve, the tubular sleeve running through the wall of the body of the cell, wherein the plug fits into a hollow of the at least one electrode and maintains electrical contact therewith when the electrode moves, an electric connector, associated with the tubular sleeve outside the wall, which connects a shielded wire connected with the measuring device, a shielded cable element inside the tubular sleeve with the core being connected to the plug, and the shield being electrically connected to the conductive tube extending to an inside of the tubular sleeve as far as the zone where the core is connected to the plug.

11. A system as claimed in claim 3, comprising electrodes having a greater longitudinal extension in relation to a length of the sample but smaller than the length of the sample so that a largest part of a volume of the sample is involved in measurements of the resistivity index without a short circuit through opposite ends of the sample.

12. A system as claimed in claim 3, comprising electrodes having a greater longitudinal extension in relation to a length of the sample but smaller than the length of the sample so that a largest part of a volume of the sample is involved in measurements of the resistivity index without a short circuit through opposite ends of the sample.

13. A system as claimed in claim 3, comprising electrodes having a greater longitudinal extension in relation to a length of the sample but smaller than the length of the sample so that a largest part of a volume of the sample is involved in measurements of the resistivity index without a short circuit through opposite ends of the sample.

14. A system as claimed in claim 3, comprising electrodes having a greater longitudinal extension in relation to a length of the sample but smaller than the length of the sample so that a largest part of a volume of the sample is involved in measurements of the resistivity index without a short circuit through opposite ends of the sample.

15. A system as claimed in claim 3, comprising electrodes having a greater longitudinal extension in relation tot length of the sample but smaller than the length of the sample so that a largest part of a volume of the sample is involved in measurements of the resistivity index without a short circuit through opposite ends of the sample.

16. A system as claimed in claim 3, comprising electrodes having a greater longitudinal extension in relation to a length of the sample but smaller than the length of the sample so that a largest part of a volume of the sample is involved in measurements of the resistivity index without a short circuit through opposite ends of the sample.

17. A system as claimed in claim 3, comprising electrodes having a greater longitudinal extension in relation to a length of the sample but smaller than the length of the sample so that a largest part of a volume of the sample is involved in measurements of the resistivity index without a short circuit through opposite ends of the sample.

* * * * *